US007010112B2

(12) United States Patent
Lee et al.

(10) Patent No.: US 7,010,112 B2
(45) Date of Patent: Mar. 7, 2006

(54) METHOD OF MANAGING TRUNK AND QUERYING AND ASCERTAINING RING-BACK SOUND TO PROVIDE RING-BACK SOUND IN SUBSCRIBER-BASED RING-BACK SOUND SERVICE

(75) Inventors: Sang-Yoen Lee, Kyungki-do (KR); Hee-Hyuk Ham, Seoul (KR); Ki-Moon Kim, Inchon (KR); Young-Tae Noh, Seoul (KR); Jae-Young Park, Sungnam-shi (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 10/525,609

(22) PCT Filed: Aug. 7, 2003

(86) PCT No.: PCT/KR03/01587

§ 371 (c)(1),
(2), (4) Date: Feb. 25, 2005

(87) PCT Pub. No.: WO2004/023833

PCT Pub. Date: Mar. 18, 2004

(65) Prior Publication Data

US 2005/0243989 A1    Nov. 3, 2005

(30) Foreign Application Priority Data

Sep. 5, 2002   (KR) .................... 10-2002-0053606
Oct. 1, 2002   (KR) .................... 10-2002-0059953
Oct. 1, 2002   (KR) .................... 10-2002-0059954

(51) Int. Cl.
*H04M 3/42*    (2006.01)
*H04M 7/00*    (2006.01)

(52) U.S. Cl. .................... 379/207.16; 379/230
(58) Field of Classification Search ............ 379/207.2, 379/207.16, 219, 220.01, 229, 230, 251, 379/252, 257; 455/401, 567, 414.1
See application file for complete search history.

(56) References Cited

U.S. PATENT DOCUMENTS

| 4,811,382 A | * | 3/1989 | Sleevi ................... 379/67.1 |
| 5,926,537 A |   | 7/1999 | Birze |
| 6,603,844 B1 | * | 8/2003 | Chavez, et al. ........ 379/114.13 |

FOREIGN PATENT DOCUMENTS

| CN | 1156301 A | * | 8/1997 |
| JP | 2000-50347 A2 |   | 2/2000 |
| JP | 2001-106685 A2 |   | 4/2000 |

(Continued)

*Primary Examiner*—Benny Quoc Tieu
(74) *Attorney, Agent, or Firm*—Harness, Dickey & Pierce, P.L.C.

(57) ABSTRACT

The present invention relates to a method of managing a trunk, and querying and ascertaining a ring-back sound to provide the ring-back sound in a subscriber-based ring-back sound service. In the trunk management method, a terminating mobile switching center (32) requests the intelligent peripheral (50) to release a trunk call when the terminating mobile switching center recognizes the answer of the terminating subscriber or when a first predetermined period of time has elapsed from a time when it is recognized that a corresponding ring-back sound is provided to the originator. Further, the intelligent peripheral (50) requests the terminating mobile switching center (32) to release the trunk call when a second predetermined period of time has elapsed from a time when the ring-back sound is provided.

13 Claims, 13 Drawing Sheets

FOREIGN PATENT DOCUMENTS

| | | |
|---|---|---|
| KR | 2000-000244 A | 1/2000 |
| KR | 2000-30035 A | 6/2000 |
| KR | 2000-55316 A | 9/2000 |
| KR | 2001-108937 A | 12/2001 |
| KR | 2002-39501 A | 5/2002 |
| WO | 2000-49793 A1 | 8/2000 |

\* cited by examiner

| PARAMETER =CallingFeaturesindicator2 | | | | | | | | LENGTH =V | TAG =H'9fff7d | |
|---|---|---|---|---|---|---|---|---|---|---|
| CONTENTS | | | | | | | | MEANING | | |
| H | G | F | E | D | C | B | A | Octet | Notes | |
| VMSB | | VMSU | | MC | | CC | | 1 | | |
| FMSNA | | FMSB | | FMSU | | VMSNA | | 2 | a | |
| SRBT | | NCW | | Prefer_Sys | | MUDN | | 3 | | |
| .... | | | | | | | | n | | |

FIG. 7

| PREFIX NUMBER | ROUTING INFORMATION |
|---|---|
| ⋮ | ⋮ |
| 293 | IP SERVER # n |
| ⋮ | ⋮ |
| xxx | IP SERVER # (n+1) |
| ⋮ | ⋮ |

FIG. 11

| SUBSCRIBER PHONE NUMBER | CODE INFORMATION |
|---|---|
| ⋮ | ⋮ |
| 293-XXXX | 07 |
| ⋮ | ⋮ |
| ⋮ | ⋮ |

FIG. 12

| CODE | RING-BACK SOUND |
|---|---|
| 01 | RING-BACK SOUND #1 |
| ⋮ | ⋮ |
| 07 | RING-BACK SOUND #7 |
| ⋮ | ⋮ |

| SUBSCRIBER PHONE NUMBER | CODE INFORMATION |
|---|---|
| ⋮ | ⋮ |
| 293-XXXX | 07 |
| ⋮ | ⋮ |
| 294-0000 | CHANGE 17 ----> 07 |
| ⋮ | ⋮ |

FIG. 16

| CODE | RING-BACK SOUND |
|---|---|
| 01 | RING-BACK SOUND #1 |
| ⋮ | ⋮ |
| 07 | RING-BACK SOUND #7 |
| ⋮ | ⋮ |
| 17 | RING-BACK SOUND #17 |
| ⋮ | ⋮ |

FIG. 17

METHOD OF MANAGING TRUNK AND QUERYING AND ASCERTAINING RING-BACK SOUND TO PROVIDE RING-BACK SOUND IN SUBSCRIBER-BASED RING-BACK SOUND SERVICE

TECHNICAL FIELD

The present invention relates, in general, to a method of managing a trunk to provide a ring-back sound in a subscriber-based ring-back sound service, and more particularly, to a method of managing a trunk between a mobile switching center and an intelligent peripheral as a channel required to provide a ring-back sound in a subscriber-based ring-back sound service for improving a conventional uniform ring-back tone providing method by providing a terminating subscriber's desired specific sound as the ring-back sound that substitutes for a typical ring-back tone. In addition, the present invention relates to a method of querying an intelligent peripheral server about a ring-back sound of a corresponding terminating subscriber (that is, the specific sound) by the intelligent peripheral having a plurality of ring-back sounds when a subscriber-based ring-back sound service is provided to improve a conventional uniform ring-back tone providing method by providing a terminating subscriber's desired specific sound as a substitute for a ring-back tone on the basis of the trunk management method. In addition, the present invention relates to a method of ascertaining a ring-back sound of a corresponding subscriber or another subscriber as a specific sound when a subscriber-based ring-back sound service is provided to improve a conventional uniform ring-back tone providing method by providing a terminating subscriber's desired specific sound as a substitute for a ring-back tone.

RELATED ART

Generally, there is adopted a method in which, if an originator attempts to place a call over a conventional mobile communication network, a mobile switching center of a terminating subscriber provides a uniform ring-back tone to the originator. However, such a conventional ring-back tone providing method is problematic in that, since the mobile switching center provides a uniform tone, the originator cannot determine whether a connection error occurs until the terminating subscriber answers, and, additionally, a service for providing various sounds corresponding to the characteristics of the users, instead of the uniform ring-back tone, cannot be provided Recently, a method of providing various pieces of advertising sounds, instead of the above-described uniform ring-back tone, has been proposed. However, this method is implemented in such a way that it provides a specific advertising sound selected by a communication network service provider to an originator without the right of choice of a subscriber, and then enables the originator to call without charge for a predetermined period of time after that Therefore, this method is also problematic in that the originator cannot determine whether a connection error occurs until a terminator answers, and, additionally, a service for providing various sounds corresponding to the characteristics of users, instead of the uniform ring-back tone, cannot be provided.

In order to solve these problems, a subscriber-based ring-back sound service method of providing a specific sound registered or selected by a terminating subscriber to an originator, instead of a typical ring-back tone, was proposed by the present applicant, which is described with reference to FIG. 1.

FIG. 1 is a flowchart of a conventional subscriber-based ring-back sound service method If an arbitrary originator requests a call connection by dialing a subscriber of the subscriber-based ring-back sound service (hereinafter, referred to as a terminating subscriber), a corresponding Originating Mobile Switching Center (O_MSC) 31 requests terminating location information from a Home Location Register (HLR) 10 (location request) at step S101.

The HLR 10 requests routing information from a terminating MSC (T_MSC) 32 in response to the request (routing request) at step S102. The T_MSC 32 responds to the routing request by providing the routing information (that is, Temporary Local Directory Number: TLDN) to the HLR 10 at step S103.

The HLR 10 responds to step S101 by sending the routing information to the O_MSC 31 at step S104. Therefore, the O_MSC 31 requests the connection of a trunk (or designated as Integrated Services Digital Network User Part: ISUP) call from the T_MSC 32 on the basis of the routing information, thereby establishing a traffic channel between the O_MSC 31 and the T_MSC 32 at step S105.

Then, the T_MSC 32 checks a state of the terminating subscriber using radio paging when receiving the ISUP call connection request at step S105 at step S106. When a response to the paging is received from a corresponding terminating terminal (not shown) at step S107, the T_MSC 32 determines whether the terminator is a service subscriber and whether the service is activated if the terminator is a service subscriber with reference to service setting information stored in the T_MSC 32. In this case, if the terminator is the service subscriber and the service is activated, the T_MSC 32 requests an ISUP call connection from an intelligent peripheral 50 to establish a traffic channel between the T_MSC 32 and the intelligent peripheral 50, and to provide terminating and originating phone numbers to the intelligent peripheral 50 at step S108.

As a result of the above operation, traffic channels are established among the O_MSC 31, the T_MSC 32 and the intelligent peripheral 50.

The intelligent peripheral 50 requests a ring-back sound code from an intelligent peripheral server 70 on the basis of the originating and terminating phone numbers at step S109. The intelligent peripheral server 70 responds to step S109 by searching for the ring-back sound code preset in connection with the originating and terminating phone numbers according to the request and sending the searched ring-back sound code to the intelligent peripheral 50 at step S110. The intelligent peripheral 50 transmits a ring-back sound corresponding to the received ring-back sound code instead of a ring-back tone to the originator through the traffic channel at step S111.

If the terminating subscriber answers the call while the ring-back sound is transmitted instead of the ring-back tone as described above, and then the T_MSC 32 recognizes the answer of the terminating subscriber, the T_MSC 32 requests the release of the ISUP call from the intelligent peripheral 50 to allow the intelligent peripheral 50 to release the call at step S112. Simultaneously, the T_MSC 32 enables telephone conversation between the originator and the terminating subscriber through the traffic channel established between the T_MSC 32 and the O_MSC 31 at step S113.

However, in the above-described subscriber-based ring-back sound service method, the MSCs generally limit a time for which a typical ring-back tone is transmitted to a preset time. Therefore, the conventional service method is problematic in that, if the preset time is longer than a time for which a ring-back sound stored in the intelligent peripheral is played, muting occurs for the time difference between them, thus causing the originator to recognize the muting rough the originating mobile terminal.

In the mean time, when a specific function is performed for the purpose of trunk management, the saving of bunk resources is a key point.

However, since the number of subscribers is small when initiating the service, one or a few intelligent peripherals 50 are located in the center of a service area, and a plurality of MSCs 31 and 32, distributed across the country, share one or a few intelligent peripherals 50. Therefore, there is a problem in that, as the number of subscribers increases, a phenomenon in which the plurality of MSCs concentrically and excessively occupy trunk resources connected to the one or a few intelligent peripherals may occur, thereby causing a service interruption.

Further, in order for a subscriber to ascertain his or her own ring-back sound or a another subscriber' ring-back sound in the above-described subscriber-based ring-back sound service method, the subscriber must hear a ring-back sound provided instead of a typical ring-back tone, as in the case of the procedure of step S109, by placing a call to a corresponding subscriber using a desired ring-back sound.

Therefore, the above-described service method is disadvantageous in that, even though a user only desires to ascertain a ring-back sound without placing a call, unnecessary trunk resources are occupied and then wasted from the standpoint of the network, and unnecessary telephone conversation is made from the standpoint of the subscriber.

DISCLOSURE OF THE INVENTION

Accordingly, the present invention has been made keeping in mind the above problems occurring in the prior art and an object of the present invention is to provide a method of managing a trunk to provide a ring-back sound in a subscriber-based ring-back sound service, which prevents muting.

Another object of the present invention is to provide a method of querying a ring-back sound in a subscriber-based ring-back sound service, which allows a mobile switching center to access an intelligent peripheral located closest thereto without passing through a gateway so as to save trunk resources when the subscriber-based ring-back sound service is provided, thus preventing mobile switching centers from excessively occupying trunk resources.

A further object of the present invention is to provide a method of ascertaining a ring-back sound in a subscriber-based ring-back sound service, which enables a subscriber to ascertain his or her own ring-back sound or another subscriber's ring-back sound without occupying unnecessary trunk resources or without placing a call in the subscriber-based ring-back sound service.

In order to accomplish the above object, the present invention provides a method of managing a trunk to provide a ring-back sound in a subscriber-based ring-back sound service, the ring-back sound service method including the steps of a) a home location register providing first information indicating whether a ring-back tone preset in the home location register is substituted and second information for performing routing to intelligent peripheral means to a corresponding terminating mobile switching center when a location of a terminating subscriber is registered; b) the terminating mobile switching center providing a ring-back tone to an arbitrary originator or requesting a connection of a trunk call from the intelligent peripheral means according to the first and second information, when the terminating mobile switching center recognizes a call connection request transmitted from the arbitrary originator to the terminating subscriber; c) the intelligent peripheral means searching for a ring-back sound preset with respect to the terminating subscriber after connecting the trunk call in response to the trunk call connection request, and providing the searched ring-back sound to the originator instead of the ring-back tone through the trunk-connected terminating mobile switching center, the trunk management method comprises the steps of the terminating mobile switching center requesting a release of the connected trunk call from the intelligent peripheral means when an answer of the terminating subscriber is recognized or when a first predetermined period of time has elapsed from a time when it is recognized that the searched ring-back sound is provided to the originator; and the intelligent peripheral means requesting a release of the connected trunk call from the terminating mobile switching center when a second predetermined period of time has elapsed from a time when the ring-back sound begins to be provided.

Preferably, the first and second predetermined period of times are set in consideration of a ring-back tone transmission time preset in the terminating mobile switching center, and a length of the ring-back sound. Preferably, the length of the ring-back sound is an average length of all ring-back sounds included in the intelligent peripheral means. Preferably, the second predetermined period of time is set to be equal to or longer than the first predetermined period of time.

Further, the present invention provides a method of querying a ring-back sound in a subscriber-based ring-back sound service, in which routing from at least one intelligent peripheral to at least one intelligent peripheral server is performed to query a ring-back sound in a subscriber-based ring-back sound service process, the intelligent peripheral being constructed in such a way that a plurality of intelligent peripherals are installed according to mobile switching centers or mobile switching center groups to allow one or more adjacent mobile switching centers to be directly trunk-connected to one of the intelligent peripherals according to singular routing information, and the intelligent peripheral server being constructed in such a way that ring-back sound codes corresponding to ring-back sounds stored in the intelligent peripherals are stored in the intelligent peripheral server to be preset and registered according to subscribers, and a plurality of intelligent peripheral servers are installed according to phone numbers of subscriber terminals, prefix numbers thereof, prefix number groups thereof, or main working areas of the subscribers to correspond to information of the subscribers, the method comprising the steps of a) when a request for a trunk call connection that allows a ring-back sound preset and registered with respect to a terminating terminal to be transmitted to an originating terminal instead of a typical ring-back tone according to routing information to a corresponding intelligent peripheral provided from the home location register, is received from a corresponding mobile switching center, the corresponding intelligent peripheral searching for routing information to one among the plurality of intelligent peripheral servers depending on information of the terminating subscriber provided from the trunk-connected corresponding mobile switching center, and b) the corresponding intelligent peripheral performing routing to the corresponding intelligent peripheral server depending on the searched routing information and querying and obtaining a code of a corresponding ring-back sound depending on the information of the terminating subscriber.

Further, the present invention provides a method of ascertaining a ring-back sound in a subscriber-based ring-back sound service, which allows a subscriber to ascertain his or her own ring-back sound or another subscriber's ring-back sound substituting for a typical ring-back tone using an automatic response service unit having a variety of ring-back sounds as specific sounds to correspond to code information when the subscribed-based ring-back sound service for providing a terminating subscriber's desired specific sound instead of the ring back tone is implemented, the automatic response service unit performing the steps of a) obtaining information of an arbitrary second subscriber using a ring-back sound to be ascertained while communicating with a mobile terminal of a first subscriber connected to the automatic response service unit through a mobile communication network depending on a preset scenario; b) requesting and obtaining code information corresponding to the second subscriber information from an intelligent peripheral server while communicating with the intelligent peripheral server having the code information to correspond to the subscriber information; and c) transmitting a ring-back sound provided to correspond to the obtained code information to the mobile terminal of the first subscriber.

Preferably, the ring-back sound may further comprise the step of d) changing code information corresponding to the first subscriber information to code information corresponding to the second subscriber information while communicating with the intelligent peripheral server, when a request for change of the transmitted ring-back sound is received from the mobile terminal of the first subscriber depending on the scenario.

Preferably, the subscriber information is a phone number of a mobile terminal of each subscriber. Preferably, the ring-back sound ascertainment method may further comprise the step of authenticating the first subscriber depending on an originating number from the mobile terminal of the first subscriber. Preferably, the automatic response service unit and the intelligent peripheral server communicate with each other through the Internet.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a view showing a format of an additional service setting message transmitted from a home location register to a terminating mobile switching center in the subscriber-based ring-back sound service method according to the present invention;

FIG. 11 is a view showing the construction of a first database of the intelligent peripheral according to the present invention;

FIG. 12 is a view showing the construction of a database of the intelligent peripheral server according to the present invention;

FIG. 16 is a view showing the construction of the database of the intelligent peripheral server according to the present invention; and FIG. 17 is a view showing the construction of the database of the intelligent peripheral according to the present invention.

Figure 1:
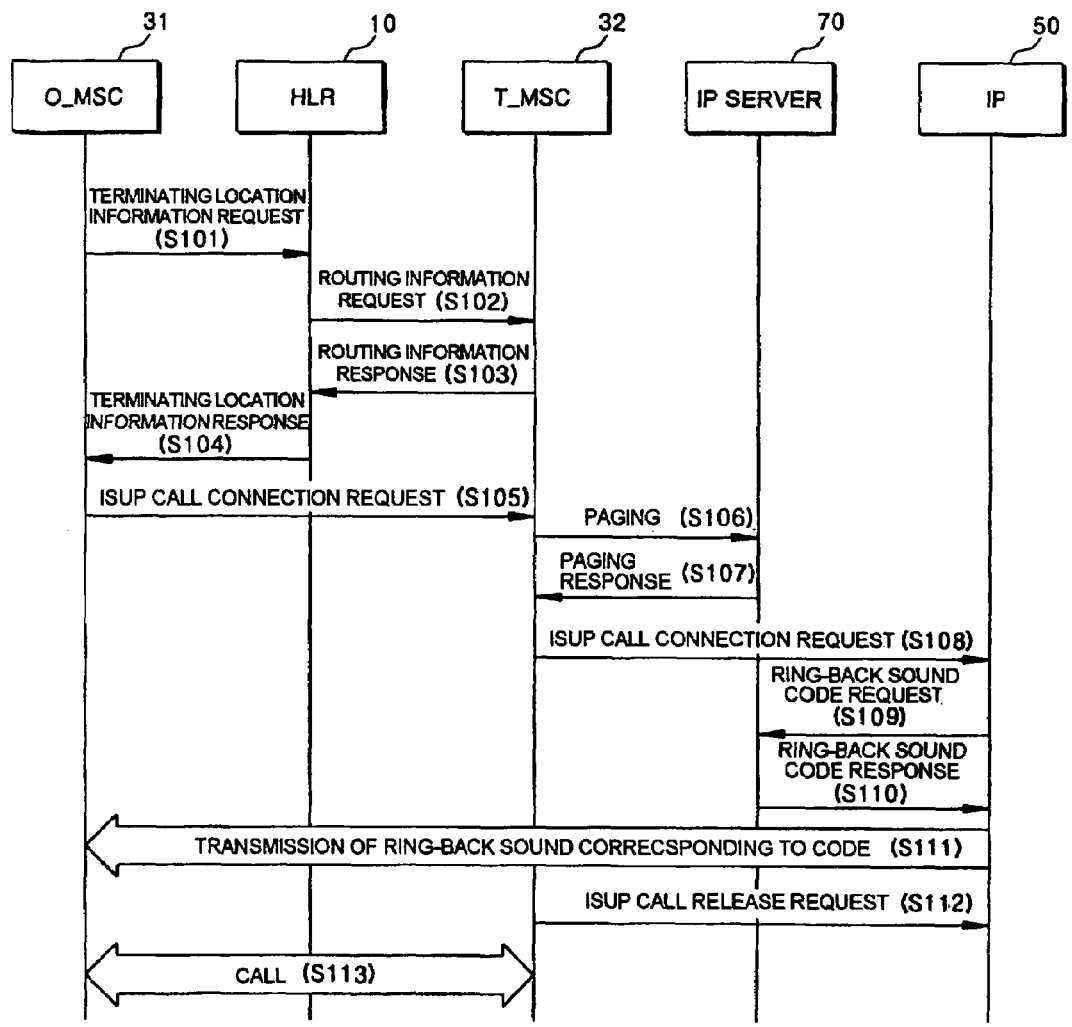
FIG. 1 is a flowchart of a conventional subscriber-based ring-back sound service method.

<Description of the numerals on the main parts of the drawings>

| | |
|---|---|
| 10: home location register | 20: No. 7 network |
| 31, 32: mobile switching center | 40, 90: gateway |
| 50: intelligent peripheral | 60: Internet |
| 70: intelligent peripheral server | 80: subscriber database |
| 100: Web server | 55: automatic response service unit |

BEST MODE FOR CARRYING OUT THE INVENTION

Reference should now be made to the drawings, in which the same reference numerals are used throughout the different drawings to designate the same or similar components.

Trunk Management Method

Hereinafter, a method of managing a trunk to provide a ring-back sound in a subscriber-based ring-back sound service according to a preferred embodiment of the present invention will be described in detail with reference to the attached drawings.

Figure 2:
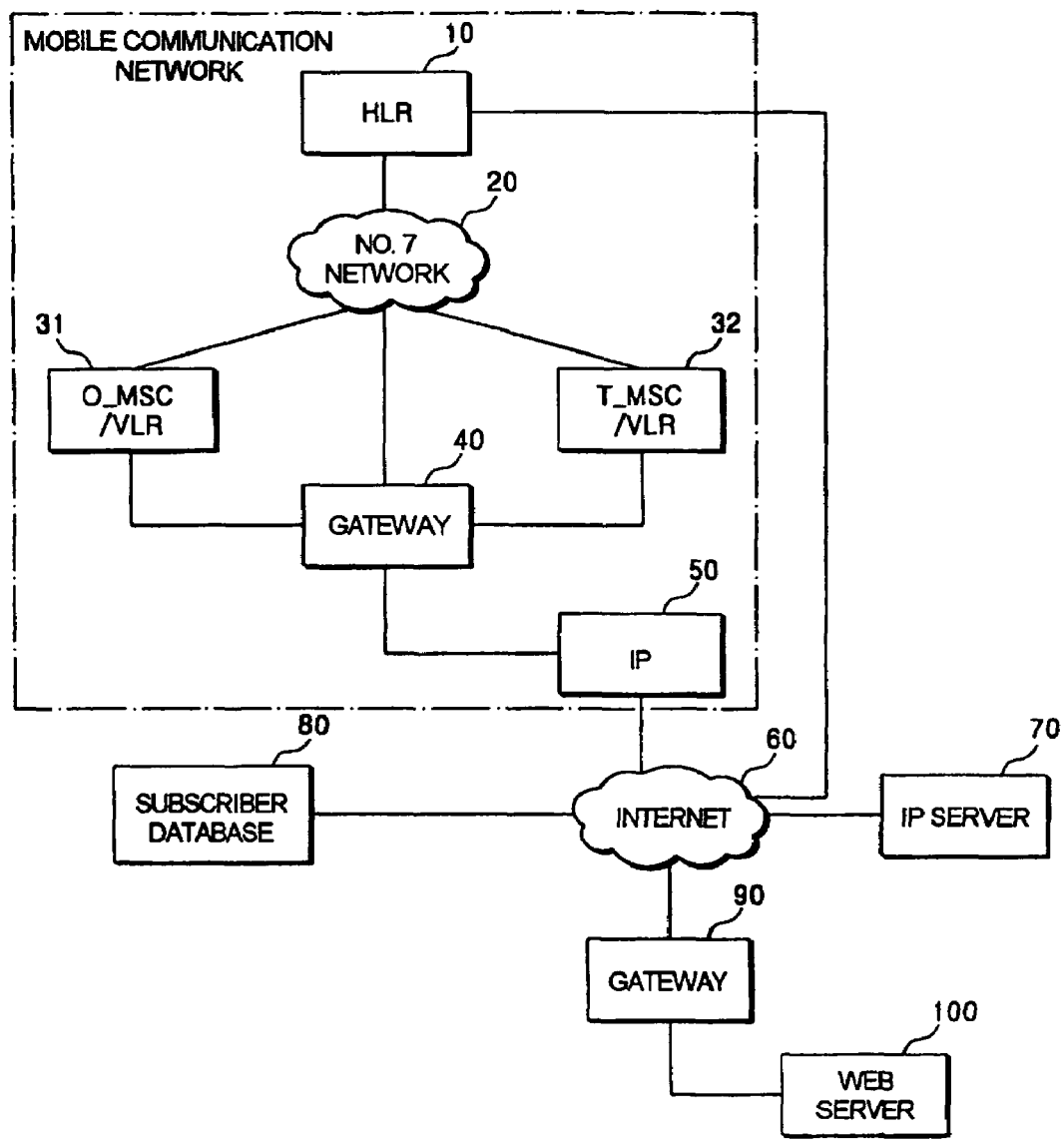
FIG. 2 is a block diagram of a subscriber-based ring-back sound service apparatus to which a subscriber-based ring-back sound service method according to the present invention is applied.

FIG. 2 is a block diagram of a subscriber-based ring-back sound service apparatus to which a subscriber-based ring-back sound service method according to the present invention is applied. As shown in FIG. 2, the service apparatus includes a Home Location Register (HLR) 10; Mobile Switching centers (O_MSC/VLR: visitor Location Register, and T_MSC/VLR) 31 and 32 communicating with the HLR 10 through a Signaling Transfer Protocol (STP)-based No. 7 network 20; an Intelligent Peripheral (IP) 50 connected to the No. 7 network 20 through a gateway (Cellular Gateway System: CGS) to communicate with both the O_MSC/VLR 31 and the T_MSC/VLR 32 through the gateway 40; an IP server 70 for performing data communication with the IP 50 through the Internet 60; a subscriber database 80 connected to the HLR 10 through the Internet 60; and a Web server 100 connected to the Internet 60 through a gateway 90 to communicate with both the IP 50 and the IP server 70.

The HLR 10 has all functions as a conventional network component, and additionally has a function of presetting and storing first information indicating whether a ring-back tone is substituted and second information for performing routing to the IP 50 as profile information of a terminating subscriber. The profile information is preset and stored as additional service subscription information of the terminating subscriber profile.

The MSCs 31 and 32 have all functions as the conventional network components, and additionally have functions of receiving and storing the preset first and second information while communicating with the HLR 10 at the time of registering the location of the terminating subscriber, receiving a ring-back sound for substituting for a typical ring-back tone while communicating with the IP 50 on the basis of the first and second information when a call connection to the terminating subscriber is requested, and providing the received ring-back sound to a corresponding originator instead of the ring-back tone.

The IP 50 stores a variety of ring-back sounds, and is characterized in that it is connected to the MSCs 31 and 32 through the gateway 40 and provides the stored ring-back sound to the MSCs 31 and 32 while communicating therewith.

The IP server 70 has a function of communicating with the IP 50 through the Internet 60 to specify the types of ring-back sounds, which the IP 50 must provide to the MSCs 31 and 32, on the basis of the combinations of identification information of terminating subscribers requested to connect calls, identification information of originators corresponding thereto and/or time slot information when call connections are requested. For example, various types of ring-back sounds can be specified according to originator, originator group, originator age, gender, occupation, and/or call originating time slot and the like. For example, when the IP server 70 assigns respective codes to various ring-back sounds stored in the IP 50, and a terminator selects originators, originator groups, call originating time slots, etc., when subscribing to the service or changing his or her information, and specifies ring-back sounds corresponding to the selected items, the IP server 70 has a plurality of pieces of information on the specified ring-back sounds in the form of a table. Therefore, the IP server 70 controls the IP 50 to provide a corresponding ring-back sound to an originating MSC on the basis of the table information.

The Web server 100 is connected to the IP 50 or the IP server 70 through the Internet 60 to add a ring-back sound to the IP 50, or change information (specific originator, originator group, call originating time slot, etc.) required to specify ring-back sounds by the IP server 70 and ring-back sound codes corresponding thereto. Such an addition and change function can be performed by the subscriber through a Web page provided from the Web server 100.

The operation of the service apparatus of FIG. 2 is described in detail.

If a terminating user, desiring to use a service that transmits a specific ring-back sound, applies for the ring-back sound service to a service provider to which the terminating user belongs, the terminating user is registered as a subscriber in the subscriber database 80 of the service provider. The subscriber database 80 registers the terminating subscriber for the service in the HLR 10 which is a component within the network. The HLR 10 sets a corresponding service in a subscriber database provided therein. Further, the HLR 10 sends service information obtained when a location registration procedure occurs, and routing data for establishing a call to the IP 50, to a corresponding MSC 31 or 32 currently performing a mobile service (that is, a serving MSC). The T_MSC 32 sets the received service information and routing data in corresponding subscriber service data.

Therefore, if an originator requests a call setup from a corresponding terminating subscriber, the T_MSC 32 recognizes that a specific ring-back sound transmitting service is set on the basis of the set service information, connects a call to the IP 50 using the routing data, and, simultaneously, informs the terminating subscriber that an incoming call is terminated (paging). At this time, the IP queries the IP server 70 which ring-back sound is set by a corresponding subscriber, in communication with the IP server 70. The IP server 70 sends a code corresponding to a ring-back sound specified by the subscriber to the IP 50. The IP 50 transmits the ring-back sound corresponding to the code to the originator, instead of a typical ring-back tone, thus enabling the originator to hear the ring-back sound until the terminating subscriber answers. When the terminating subscriber receives the incoming call, the T_MSC 32 releases a call channel established with the IP 50, and connects the originator and the terminating subscriber to enable telephone conversation between them.

Now, the trunk management method to provide a ring-back sound in the subscriber-based ring-back sound service applied to the present invention is described in detail. In this case, since the trunk management method is applied to the subscriber-based ring-back sound service apparatus, it is described in parallel to the operation of the service apparatus of FIG. 2.

Figure 3:
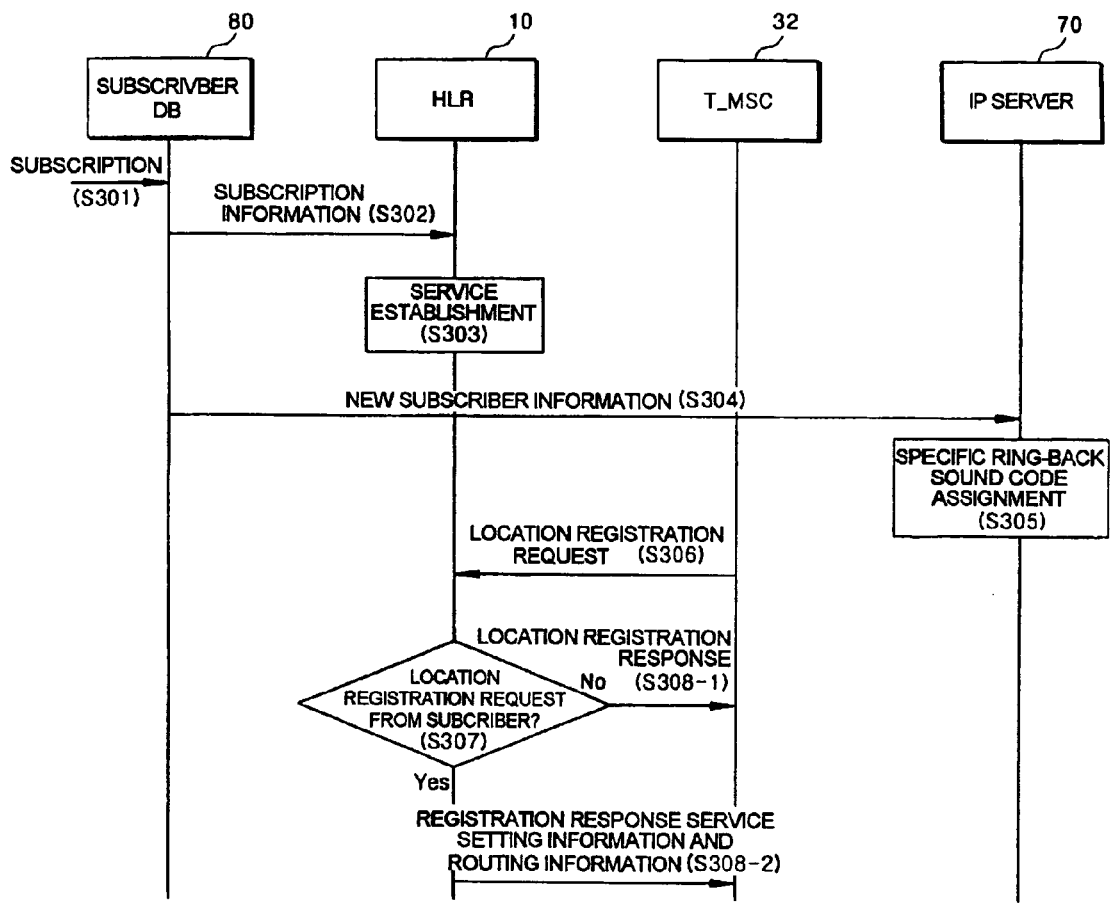
FIG. 3 is a flowchart showing a service subscription procedure in the subscriber-based ring-back sound service method according to the present invention.

FIG. 3 is a flowchart showing a service subscription procedure in the subscriber-based ring-back sound service method according to the present invention.

If there is any request for subscribing to the service of the present invention, that is, the subscriber-based ring-back sound service, at step S301, information indicating that a corresponding applicant (that is, a phone number of the applicant) is subscribed to the ring-back sound service in response to the request is stored in the subscriber database 80. In addition, subscription information (including the phone number) is sent to the HLR 10 from the database 80 at step S302. Therefore, the information indicating that the applicant is subscribed to the service of the present invention is set in corresponding subscriber profile of the HLR 10 at step S303. Further, new subscriber information, including a phone number of a new subscriber, the type of ring-back sound selected by the subscriber and the like, is sent from the database 80 to the IP server 70 when the applicant subscribes to the service at step S304. The IP server 70 assigns a code of the selected ring-back sound in connection with the phone number of the new subscriber on the basis of the received new subscriber information at step S305.

Meanwhile, if information, specifying ring-back sounds to transmit different ring-back sounds according to originators, originator groups, and call originating time slots with respect to the corresponding terminating subscriber, is included in the new subscriber information at step S305, the IP server 70 assigns ring-back sound codes differently according to classified items.

Thereafter, if any location registration request message (Registration Notification) is received from the T_MSC 32 at step S306, the HLR 10 determines whether the location registration request is received from a subscriber to the service of the present invention (that is, whether a terminal requesting the location registration is subscribed to the service of the present invention) by checking the subscriber profile at step S307. If the location registration request is not received from a subscriber, the HLR 10 sends only a response message to the location registration to the T_MSC 32 at step S308-1. On the contrary, if the location registration request is received from a subscriber, the HLR 10 includes the service setting information of the present invention and routing information to the IP 50 (for example, a number for enabling the T_MSC 32 to perform routing to the IP 50: RoutingDigits) in the response message to the location registration, and sends the response message to the T_MSC 32, thus enabling the T_MSC 32 to have the service setting information and the routing information at step S308-2.

An embodiment of a method of sending the service setting information is described below. As shown in FIG. 7, a reserve field of an additional service parameter (CallingFeatureIndicator2) is used as a ring-back tone field (Specific RingBackTone: SRBT), which is represented by 2-bit data. For example, data "10" indicates that a corresponding terminal is subscribed to the service, but the service is not activated, and data "11" indicates that a corresponding terminal is subscribed to the service and the service is activated. Such service setting information is included in the response message to the location registration, which is sent from the HLR 10 to the T_MSC 32.

Figure 6:
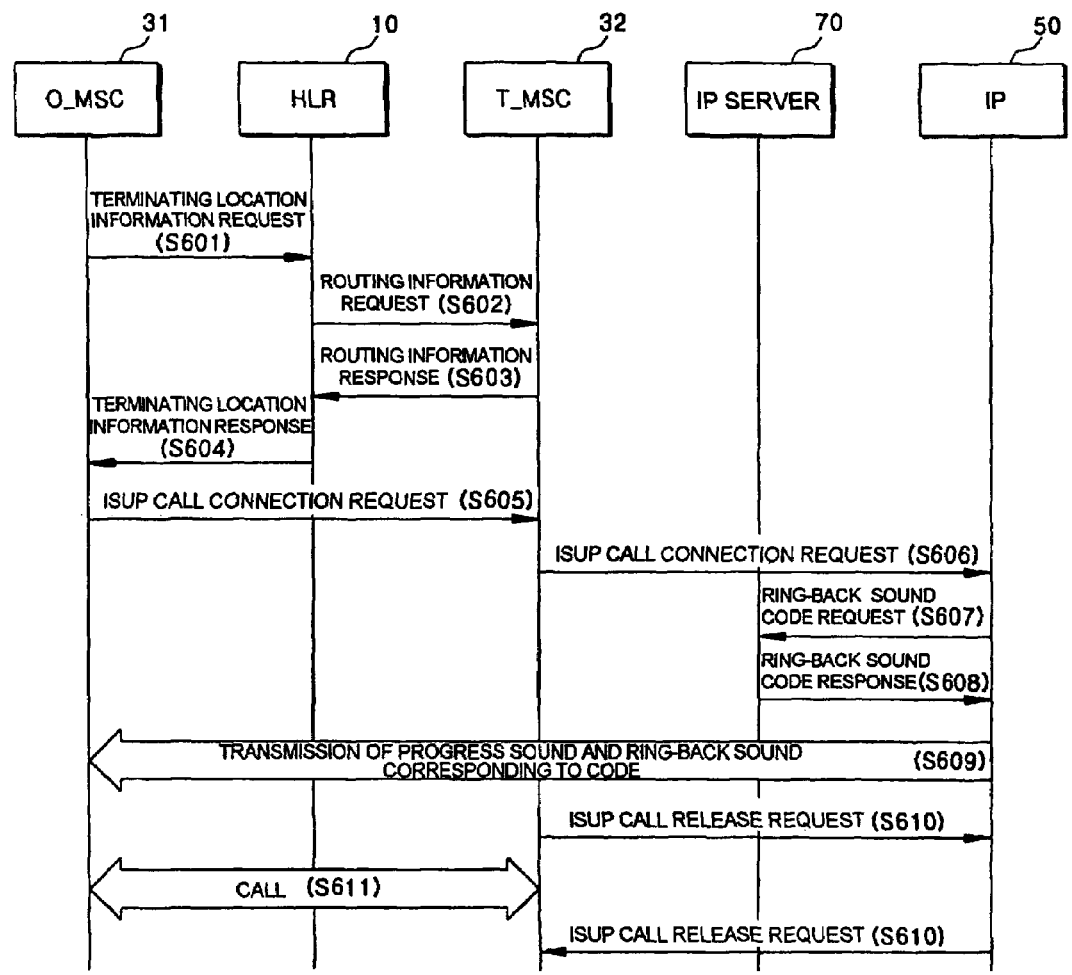
FIG. 6 is a flowchart of a method of managing a trunk to provide a ring-back sound in the subscriber-based ring-back sound service method according to the present invention, wherein the trunk management method is an actual service procedure performed after the procedures of FIG. 3 and/or FIG. 4 are completed.

For reference, a VMSB field, a VMSU field, a VMSNA field, an FMSNA field, an FMSB field, an FMSU field, an MC field, a CC field, and an MUDN field of FIG. 6 indicate additional services represented by 2-bit data, respectively. The above fields indicate a Voice Mail Service Busy state, a Voice Mail Service Busy Unconditional state, a Voice Mail Service Busy No Answer state, a Fax Mail Service No Answer state, a Fax Mail Service Busy state, a Fax Mail Service Unconditional state, a Multi-Call state, a Conference Call, and a Multiple Unit Directory Number, respectively.

Figure 4:
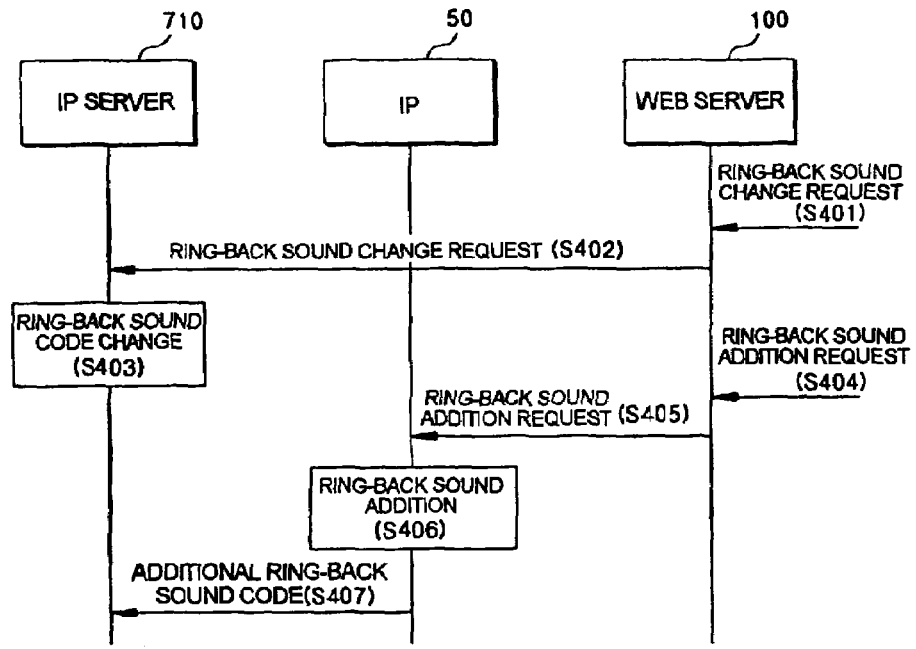
FIG. 4 is a flowchart showing a service change/addition procedure in the subscriber-based ring-back sound service method according to the present invention.

FIG. 4 is a flowchart showing a service change/addition procedure in the subscriber-based ring-back sound service method according to the present invention.

As described above, if a subscriber subscribed according to the procedure of FIG. 3 accesses the designated Web server 100 using a Personal Computer (PC) or the like, the Web server 100 provides a Web page in which information can be changed/added with respect to the service of the present invention to a screen of the PC.

Therefore, if the subscriber enters his or her phone number through the Web page, and then requests the Web server 100 to change a ring-back sound by selecting one from a list of a plurality of ring-back sounds prestored in the IP 50 at step S401, the Web server 100 requests the IP server 70 to change the ring-back sound at step S402. The IP server 70 deletes the code of a ring-back sound, set before in connection with the subscriber (phone number), according to the request, and stores the code of the newly selected ring-back sound in connection with the subscriber, thus transmitting the selected ring-back sound to an originator placing a call to the subscriber, instead of a typical ring-back tone, at step S403.

In the meantime, if the subscriber requests the Web server 100 to add a ring-back sound by attaching a voice message file, a logo file or a specific music file personally produced or obtained by the subscriber to his or her phone number and sending the phone number with the file attached thereto to the Web server 100 after selecting a ring-back sound addition through the Web page at step S404, the Web server 100 requests the IP 50 to add the ring-back sound at step S405. The IP 50 obtains the attached file as an additional ring-back sound according to the request at step S406. Simultaneously, the IP server 70 controls the code of the additional ring-back sound to be linked to the corresponding subscriber phone number at step S407.

Figure 5:
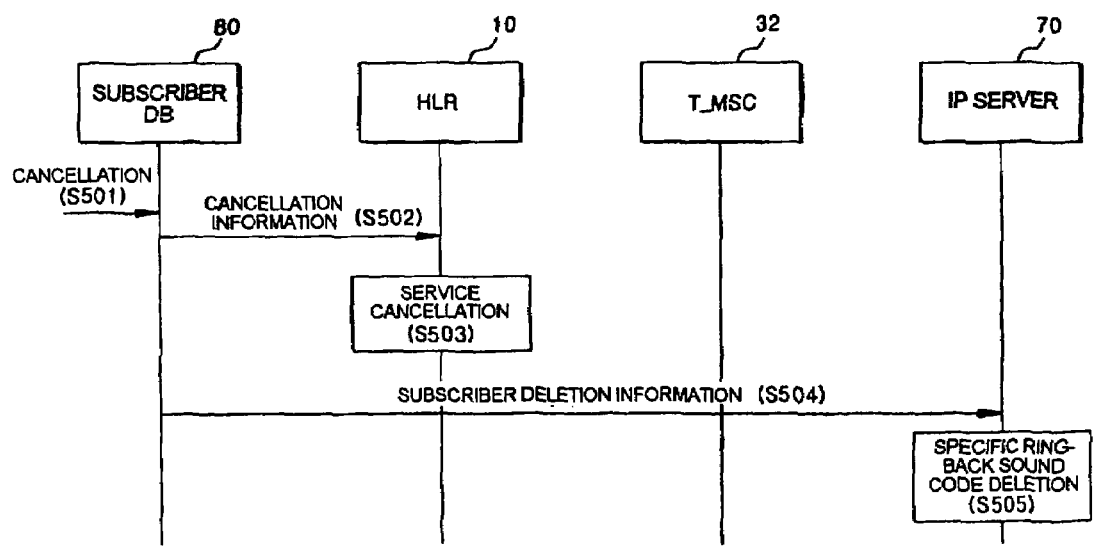
FIG. 5 is a flowchart showing a service cancellation procedure in the subscriber-based ring-back sound service method according to the present invention.

FIG. 5 is a flowchart showing a service cancellation procedure in the subscriber-based ring-back sound service method according to the present invention.

If any cancellation request is received from the subscriber to the service of the present invention, that is, the subscriber-based ring-back sound service, at step S501, the subscriber database 80 is updated to allow the subscription of the requesting subscriber (the phone number of the requesting subscriber) to be canceled according to the cancellation request. In addition, cancellation information (including the phone number) is sent from the database 80 to the HLR 10 at step S502. The HLR 10 updates corresponding subscriber profile so that the subscriber cancels the service at step S503. Further, the cancellation information including the phone number of the canceling subscriber (that is, subscriber deletion information) is sent from the database 80 to the IP server 70 when the subscriber cancels the service at step S504. The IP server 70 deletes the ring-back sound code assigned at step S305 on the basis of the received cancellation information at step S505.

FIG. 6 is a flowchart of a method of managing a trunk to provide a ring-back sound in the subscriber-based ring-back sound service method according to the present invention. In this case, the trunk management method is an actual service procedure performed after the procedures of FIG. 3 and/or FIG. 4 are completed.

If an arbitrary originator requests a call connection by dialing a service subscriber of the present invention (hereinafter, referred to as terminating subscriber), a corresponding O_MSC 31 requests terminating location information from the HLR 10 (location request) at step S601.

The HLR 10 requests routing information from the T_MSC 32 in response to the request (Touting request) at step S602. Therefore, the T_MSC 32 responds to the request by providing the routing information (that is, TLDN) to the HLR 10 at step S603.

The HLR 10 responds to step S601 by sending the routing information to the O_MSC 31 at step S604. Therefore, the O_MSC 31 requests an ISUP call connection from the T_MSC 32 on the basis of the routing information, thereby establishing a traffic channel between the O_MSC 31 and the T_MSC 32 at step S605.

Then, the T_MSC 32 checks the service setting information of the present invention stored therein (the information received and stored at step S308-2 of FIG. 3 and indicated in the SRBT field of FIG. 7). That is, if the SRBT field indicates "11", the T_MSC 32 recognizes that a terminator is a service subscriber of the present invention and the service is activated. Therefore, the T_MSC 32 requests the connection of an ISUP call from the IP 50 on the basis of the routing information received and stored at step S308-2 of FIG. 3, thereby establishing a traffic channel between the T_MSC 32 and the IP 50, and, simultaneously, providing the terminating and originating phone numbers to the IP 50 at step S606. According to the result of step S606, trunk channels are established among the O_MSC 31, the T_MSC 32 and the IP 50.

The IP 50 requests a ring-back sound code from the IP server 70 on the basis of the received terminating and originating phone numbers at step S607. The IP server 70 responds to step S607 by searching for a ring-back sound code designated in connection with the received terminating and originating phone numbers according to the request, and sending the searched ring-back sound code to the IP 50 at step S608. The IP 50 transmits a ring-back sound corresponding to the ring-back sound code to the originator through the established trunk instead of a progress tone and a typical ring-back tone at step S609.

If the terminating subscriber answers the call while the corresponding ring-back sound is transmitted instead of the ring-back tone as described above and then the T_MSC 32 recognizes the answer of the terminating subscriber, the T_MSC 32 requests the release of the ISUP call from the IP 50 to allow the IP 50 to release the call at step S610. Simultaneously, the T_MSC 32 enables telephone conversation between the originator and the terminating subscriber through the traffic channel established between the T_MSC 32 and the O_MSC 31 at step S611.

Further, in order to prevent the occurrence of a situation in which the terminating subscriber is out of a service area to be incapable of answering paging (No Page Response: NPR) or incapable of receiving the paging (No Answer: NA) while the corresponding ring-back sound is transmitted instead of the ring-back tone as described above at step S610, the T_MSC 32 and the IP 50 can be operated in the following manner. That is, even though the T_MSC 32 does not recognize the answer of the terminating subscriber like the above case, the T_MSC 32 requests the release of the connected ISUP call from the IP 50 if a first predetermined period of time has elapsed from the time when it is recognized that the corresponding ring-back sound is provided to the originator, thereby releasing the ISUP call at step S612. Further, at step S612, even though a request for the release of the ISUP call is not received from the T_MSC 32, the IP 50 requests the release of the connected ISUP call from the T_MSC 32 after a second predetermined period of time has elapsed from the time when the ring-back sound begins to be provided, thus releasing the ISUP call.

That is, the request for the ISUP call release at-step S610 is required for a call release procedure from the T_MSC 32 to the IP 50 when the terminating subscriber answers the call while the ring-back sound is provided. At this time, if the terminating subscriber cannot answer the call for a certain period of time due to the NPR or NA, the T_MSC 32 requests the ISUP call release from the IP 50 depending on a preset timer value (that is, the first predetermined period of time).

Generally, the first predetermined period of time is set to 40 to 50 seconds, but it may differ according to MSCs. Therefore, the IP 50 must continuously play and transmit the corresponding ring back sound for the certain period of time before receiving the request message for the ISUP call release from the T_MSC 32. Further, the request for the ISUP call release at step S612 is required for a call release procedure when a request message for the ISUP call release transmitted from the T_MSC 32 is lost, or when the timer value, the first predetermined period of time, is set to be long in a corresponding MSC to occupy the ISUP call with the IP 50 for a long period of time. At this time, if the request message for the ISUP call release is not received from the T_MSC 32 within the second predetermined period of time, the IP 50 sends the request message for the ISUP call release to the T_MSC 32 when the second predetermined period of time has elapsed.

The first and second predetermined period of times are set in consideration of a ring-back tone transmission time preset in the T_MSC 32 and a length of a ring-back sound. Preferably, the length of a ring-back sound represents the average length of all ring-back sounds, and the second predetermined period of time is set to be equal to or longer than the first predetermined period of time.

In the mean time, the subscriber-based ring-back sound service method according to the present invention enables a terminating subscriber to access the HLR 10 to change the service setting information of the present invention set in the SRBT field of the HLR 10. For example, when the terminating subscriber presses a specific key through his or her mobile terminal, the key information is sent to the HLR 10. The HLR 10 can change the 2-bit data indicated in the SRBT field on the basis of the key information. However, since an upper bit of the 2-bit data indicates whether a terminator is subscribed to the service of the present invention, it is set not to be changed. Further, since a lower bit thereof indicates whether the service is activated, it is set to be changed. That is, in the case of the subscriber, two types of data "10" and "11" may exist as data indicated in the SRBT field. Data "10" represents the inactivation of the service, and data "11" represents the activation of the service. At this time, the terminating subscriber can freely change the data from "10" to "11", or from "11" to "10" depending on the selection of the specific key. Therefore, the terminating subscriber can determine whether to use the typical ring-back tone as it is, or to use a selected ring-back sound instead of the progress tone or the typical ring-back tone, at the subscriber's own will.

Therefore, if data "10" is indicated in the SRBT field, the T_MSC 32 provides the typical ring-back tone to the originator even though the terminator is the service subscriber.

Ring-Back Sound Query Method

Hereinafter, a method of querying a ring-back sound in the subscriber-based ring-back sound service according to a preferred embodiment of the present invention will be described in detail with reference to the attached drawings.

Figure 8:
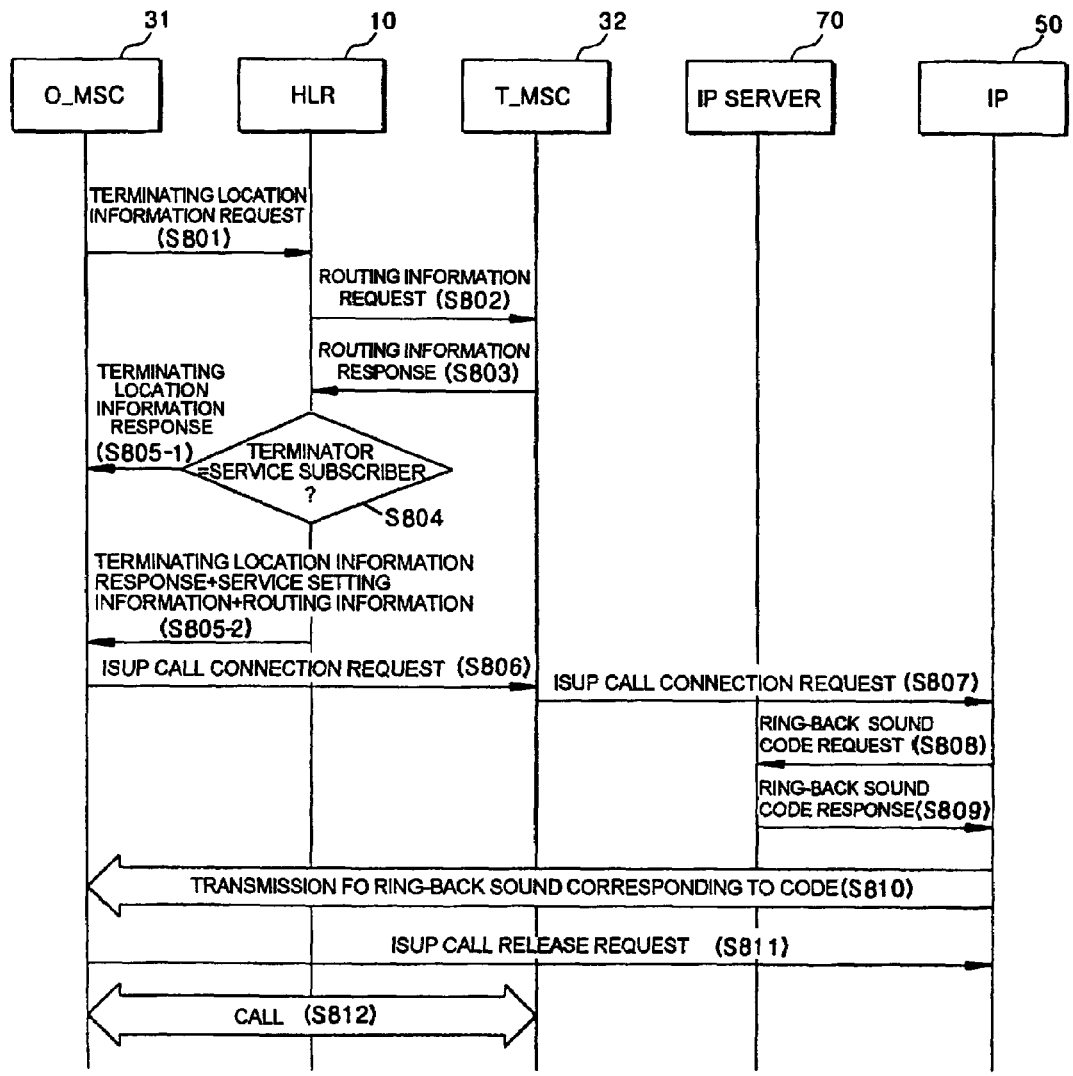
FIG. 8 is a flowchart of a conventional subscriber-based ring-back sound service method using an originating mobile switching center previously proposed by the present applicant.

FIG. 8 is a flowchart of a conventional subscriber-based ring-back sound service method using an originating mobile switching center previously proposed by the present applicant This service method is disclosed in Korean Patent Application No. 10-2002-0047212 (9 Aug. 2002). For ease of understanding of the present invention, the construction and operation of the conventional service method is described in brief.

First, if an arbitrary originator requests a call connection by dialing a subscriber of the subscriber-based ring-back sound service (hereinafter, referred to as a terminating subscriber), a corresponding O_MSC 31 requests terminating location information from a HLR 10 (location request) at step S801.

The HLR 10 requests routing information from a T_MSC 32 in response to the request (routing request) at step S802.

The T_MSC 32 responds to the routing request by providing the routing information (that is, TLDN) to the HLR 10 at step S803.

The HLR 10 responds to the step S201 by sending the routing information to the O_MSC 31. In this case, the HLR 10 determines whether a corresponding terminator is a service subscriber (that is, whether a terminating terminal is subscribed to the ring-back sound service) by checking subscriber profile when responding at step S804. Thereafter, if the terminator is not a subscriber, the HLR 10 includes only TLDN information in a response message to the terminating location information request and sends the response message to the O_MSC 31 in the same manner as the conventional service method at step S805-1. On the contrary, if the terminator is a subscriber, the HLR 10 includes both service setting information and routing information to the intelligent peripheral 50 (for example, a number enabling the O_MSC 31 to perform routing to the intelligent peripheral 50: RoutingDigits) in a response message, and sends the response message to the O_MSC 31 at step S805-2.

The O_MSC 31 may request the connection of a trunk (or designated as ISUP) call from only the T_MSC 32 on the basis of the response message provided from the HLR 10 according to the results of step S805-1 or S805-2, thereby establishing a traffic channel between the O_MSC 31 and the T_MSC 32 at step S806. Alternatively, the O_MSC 31 selectively and simultaneously may request the connection of an ISUP call from the intelligent peripheral 50, thus establishing a traffic channel between the O_MSC 31 and the intelligent peripheral 50 at step S807.

Then, if the traffic channel is established between the O_MSC 31 and the intelligent peripheral 50 at step S807, the intelligent peripheral 50 queries and requests a ring-back sound code from the intelligent peripheral server 70 on the basis of terminating and originating phone numbers at step S808. The intelligent peripheral server 70 responds to the step S808 by searching for the ring-back sound code preset in connection with the originating and terminating phone numbers in response to the request and sending the searched ring-back sound code to the intelligent peripheral 50 at step S809. The intelligent peripheral 50 transmits a ring-back sound corresponding to the received ring-back sound code instead of the ring-back tone to the originator through the traffic channel at step S810.

Finally, if the terminating subscriber answers the call while the ring-back sound is transmitted instead of the ring-back tone as described above and then the O_MSC 31 recognizes the answer of the terminating subscriber, the O_MSC 31 requests the release of the ISUP call from the intelligent peripheral 50 to allow the intelligent peripheral 50 to release the call at step S811. Simultaneously, the O_MSC 31 enables telephone conversation between the originator and the terminating subscriber through the traffic channel established between the T_MSC 32 and the O_MSC 31 at step S812.

FIG. 2 is a block diagram of the subscriber-based ring-back sound service apparatus to which the subscriber-based ring-back sound service method according to the present invention is applied. FIG. 2 is a block diagram of a subscriber-based ring-back sound service apparatus to which a subscriber-based ring-back sound service method according to the present invention is applied. As shown in FIG. 2, the service apparatus includes a Home Location Register (HLR) 10; Mobile Switching centers (O_MSC/VLR and T_MSC/VLR) 31 and 32 communicating with the HLR 10 through a Signaling Transfer Protocol (STP)-based No. 7 network 20; an Intelligent Peripheral (IP) 50 connected to the No. 7 network 20 through a gateway (CGS) to communicate with both the O_MSC/VLR 31 and the T_MSC/VLR 32 through the gateway 40; an IP server 70 for performing data communication with the IP 50 through the Internet 60; a subscriber database 80 connected to the HLR 10 through the Internet 60; and a Web server 100 connected to the Internet 60 through a gateway 90 to communicate with both the IP 50 and the IP server 70.

The HLR 10 has all the functions of a conventional network component, and additionally has a function of presetting and storing first information indicating whether a ring-back tone is substituted and second information for performing routing to the IP 50 as profile information of a terminating subscriber. The profile information is preset and stored as additional service subscription information of the terminating subscriber profile.

The MSCs 31 and 32 have all the functions of the conventional network components, and additionally have functions of receiving and storing the preset first and second information while communicating with the HLR 10 at the time of registering the location of the terminating subscriber, receiving a ring-back sound for substituting for a typical ring-back tone while communicating with the IP 50 on the basis of the first and second information when a call connection to the terminating subscriber is requested, and providing the received ring-back sound to a corresponding originator instead of the ring-back tone. As another example (according to the method of FIG. 8), each of the MSCs 31 and 32 has functions of requesting a call connection from a corresponding T_MSC similar to the conventional method, and, simultaneously, requesting a call connection from the IP 50 on the basis of the first and second information included in a terminating location information response message, if receiving the terminating location information response message from the HLR 10 while functioning as an O_MSC.

In the subscriber-based ring-back sound service method as shown in FIGS. 1 and 8, the IP 50 is generally characterized in that it stores a variety of ring-back sounds therein, and it is connected to the MSCs 31 and 32 through the gateway 40 to provide the stored ring-back sounds to the MSCs 31 and 32 while communicating therewith. However, in the present invention, the IP 50 is further characterized in that several IPs are locally dispersed to allow each IP to be directly trunk-connected to one or more adjacent MSCs on the basis of singular routing information without passing through a gateway (refer to a later description of FIG. 9). For these operations, each IP 50 stores ring-back sounds of all subscribers to correspond to codes. Additionally, the IP 50 identifies routing information to one of a plurality of IP servers on the basis of the information of a terminating subscriber provided from the trunk-connected corresponding MSC. In this case, the plurality of IP servers are classified according to phone numbers of subscribers, prefix numbers thereof, prefix number groups thereof, or main working areas of subscribers. Then, the IP 50 performs routing to the corresponding IP server on the basis of the identified routing information, and thereafter queries and obtains a code of a ring-back sound on the basis of the information of the terminating subscriber.

The IP server 70 has a function of communicating with the IP 50 through the Internet 60 to specify the types of ring-back sounds, which the IP 50 must provide to the MSCs 31 and 32, on the basis of the combinations of identification information of terminating subscribers requested to connect calls, identification information of originators corresponding thereto and/or time slot information when call connections are requested. For example, various types of ring-back sounds can be specified according to originator, originator group, originator age, gender, occupation, and/or call originating time slot. For example, when the IP server 70 assigns respective codes to various ring-back sounds stored in the IP 50, and a terminator selects originators, originator groups, call originating time slots, etc., when subscribing to the service or changing his or her information, and specifies ring-back sounds corresponding to the selected items, the IP server 70 has a plurality of pieces of information on the specified ring-back sounds in the form of a table. In this state, the IP server 70 provides code information of a subscriber, queried by the IP 50, to the IP 50, thus enabling a ring-back sound corresponding to the code to be provided to the MSC 32.

The Web server 100 is connected to the IP 50 or the IP server 70 through the Internet 60 to add a ring-back sound to the IP 50, or change information (specific originator, originator group, call originating time slot, etc.) required to specify ring-back sounds by the IP server 70 and ring-back sound codes corresponding thereto. Such an addition and change function can be performed by the subscriber through a Web page provided from the Web server 100.

Figure 9:
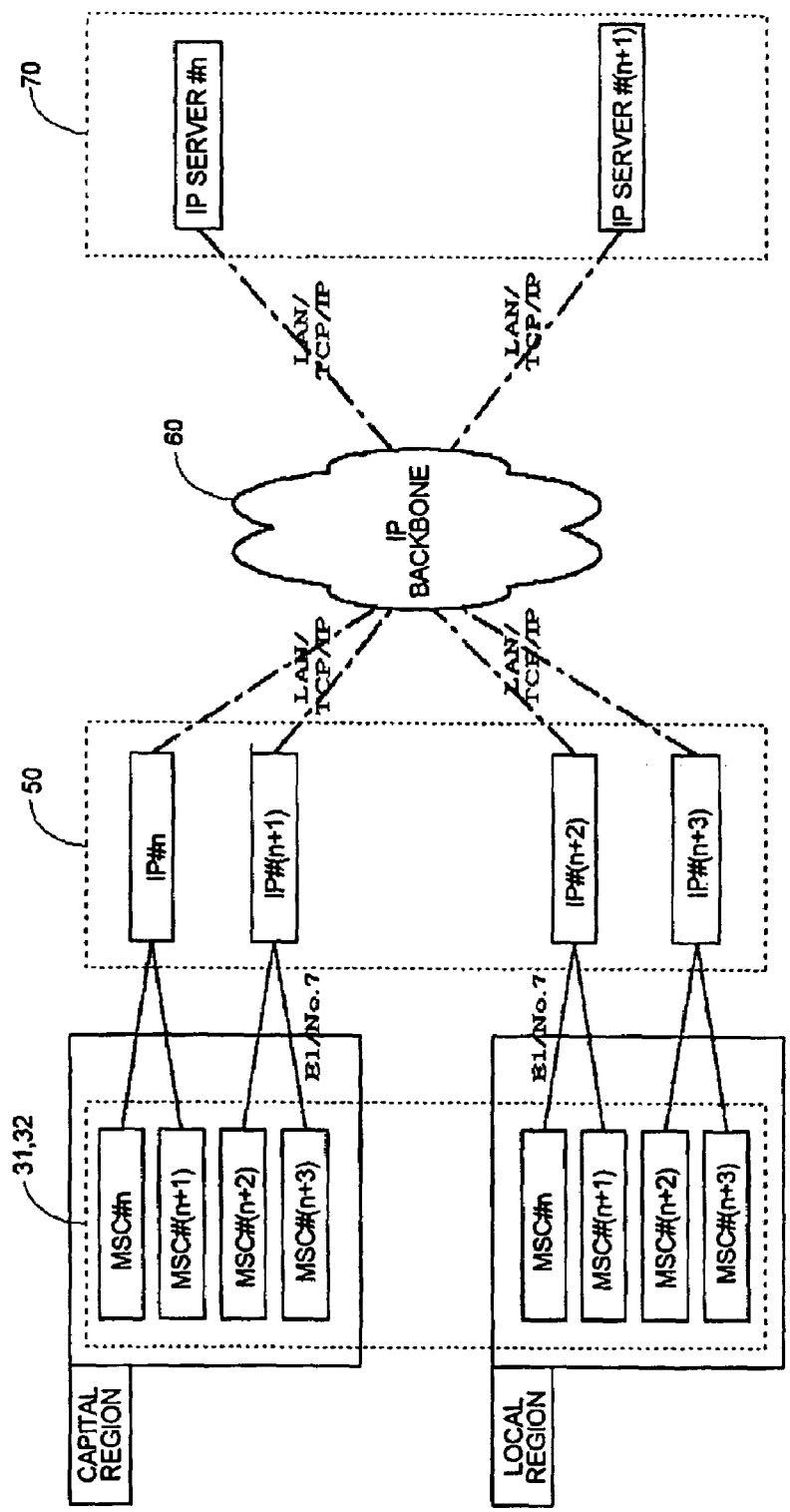
FIG. 9 is a view showing an example of a network connection among mobile switching centers, an intelligent peripheral and an intelligent peripheral server of FIG. 2 according to the present invention.

FIG. 9 is a view showing an example of a network connection among the MSCs 31 and 32, the IP 50 and the IP server 70 of FIG. 2. As shown in FIG. 9, the IP 50, that is, IP #n, IP #(n+1), IP #(n+2) and IP #(n+3) are locally dispersed to allow one or more adjacent MSCs to be directly trunk-connected to each IP on the basis of singular routing information. The IP #n, IP #(n+1), IP #(n+2) and IP#(n+3) locally dispersed in this way identify routing information to one of the IP server 70, that is, IP server #n and IP server #(n+1), for example, installed in the center of a service area, on the basis of the information of terminating subscribers provided from trunk-connected MSCs 31 and 32.

In this case, the IP servers are classified according to the phone numbers of subscribers, prefix numbers thereof, prefix number groups thereof, or main working areas of subscribers by a system operator. Then, the IP 50 performs routing to the corresponding IP server 70 (one of the IP server #n and the IP server #(n+1)), through the Internet 60 on the basis of the identified routing information, thus querying a code of a ring-back sound.

Figure 10:
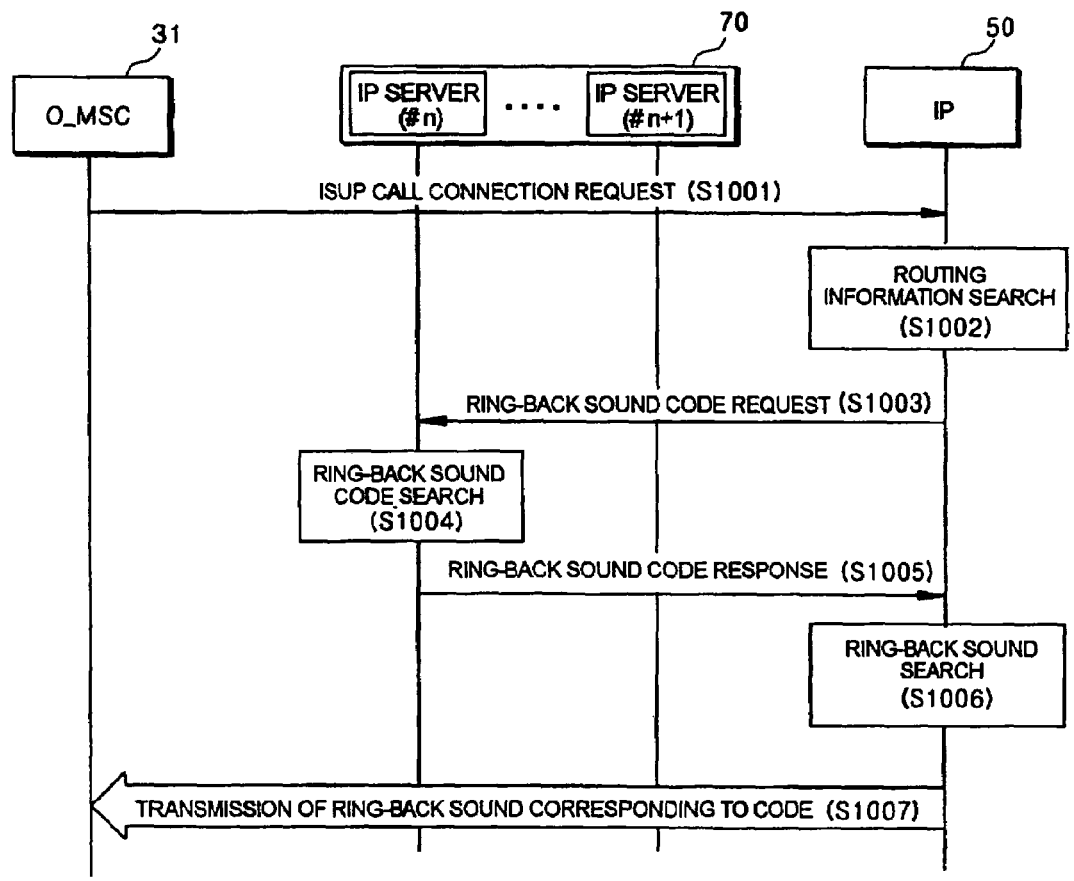
FIG. 10 is a flowchart of a method of querying a ring-back sound in the subscriber-based ring-back sound service method according an embodiment of the present invention.

FIG. 10 is a flowchart of a method of querying a ring-back sound in the subscriber-based ring-back sound service method according an embodiment of the present invention. For convenience of description, it is premised that a plurality of pieces of routing information from the IP 50 to the IP server 70 are classified according to prefix numbers of subscribers among the phone numbers of subscribers, prefix numbers thereof, prefix number groups thereof, or main working areas of the subscribers.

First, if the O_MSC 31 requests an ISUP call connection from the IP 50 (that is, one of the IP #n, IP #(n+1), IP #(n+2) and IP #(n+3) of FIG. 9) located close to the O_MSC 31 or the T_MSC 32 to establish a trunk channel between the O_MSC 31 and the IP 50, as in the case of steps S106 of FIG. 1 and S807 of FIG. 8, at step S1001, the IP 50 searches a first database thereof, in which pieces of routing information to the IP server 70 are classified and stored according to prefix numbers of subscribers as shown in FIG. 11, for routing information corresponding to a prefix number of a terminating subscriber on the basis of a phone number of the terminating subscriber provided at step S1001. At this time, if the phone number of the terminating subscriber is "293-xxxx", the IP 50 identifies and searches for routing information corresponding to the prefix number "293", that is, routing information to the IP server #n, at step S1002.

The IP 50 performs routing to the IP server 70, that is, IP server #n, according to the identified routing information, and then queries the IP server 70 about a ring-back sound code and requests the ring back sound code, on the basis of the phone number information of the terminating subscriber at step S1003.

The IP server 70 (IP server #n) searches a database thereof, in which a plurality of pieces of code information are stored in connection with subscriber phone numbers as shown in FIG. 12, for a ring-back sound code "07" corresponding to the phone number of the terminating subscriber "293-xxxx" in response to the request at step S1003 at step S1004. The IP server 70 responds to step S1003 by sending the searched ring-back sound code "07" to the IP 50 at step S1005.

Figures 13, 14:
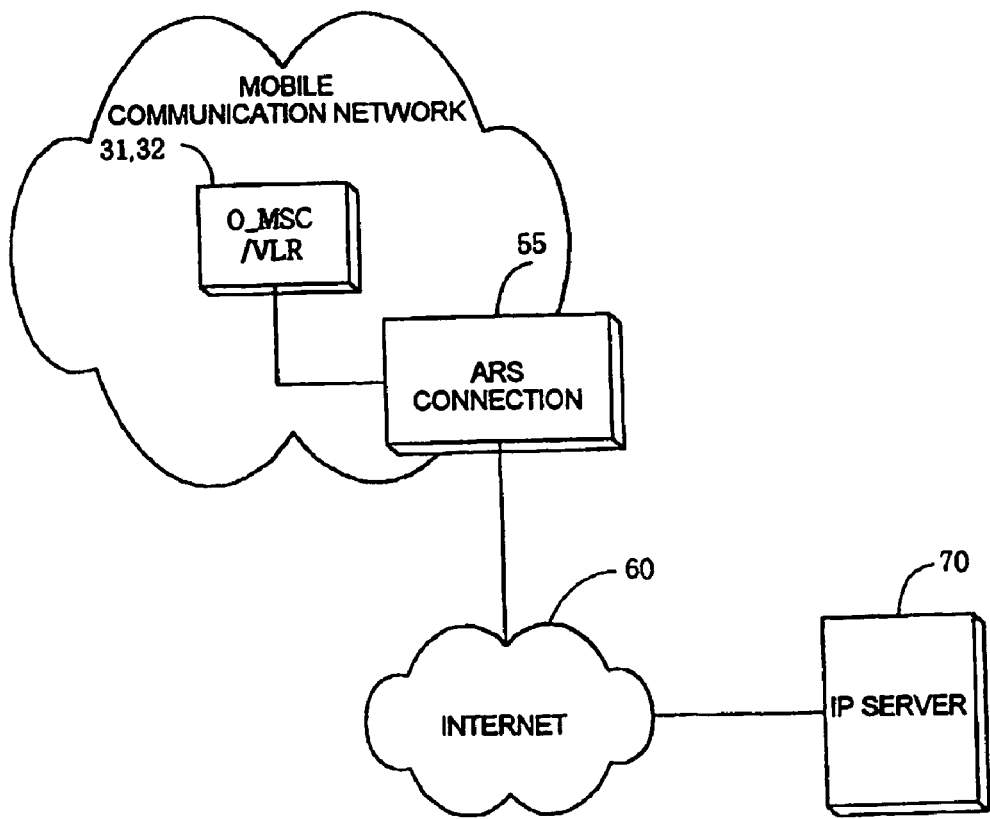
FIG. 13 is a view showing the construction of a second database of the intelligent peripheral according to the present invention.
FIG. 14 is a view showing the basic construction of an apparatus for implementing a method of ascertaining a ring-back sound in the subscriber-based ring-back sound service on the basis of the apparatus of FIG. 2 according to an embodiment of the present invention.

The IP 50 searches a second database thereof, in which ring-back sound codes and ring-back sounds are stored to correspond to each other as shown in FIG. 13, for a ring-back sound #7 corresponding to the ring-back sound code "07" received at step S1005 at step S1006. The IP 50 transmits the ring-back sound #7 instead of the ring-back tone to a corresponding originator through a traffic channel established between the O_MSC 31 and the IP 50 at step S1007.

Ring-Back Sound Ascertainment Method

Hereinafter, a method of ascertaining a ring-back sound in the subscriber-based ring-back sound service according to a preferred embodiment of the present invention will be described in detail with reference to the attached drawings.

The service apparatus of FIG. 2 is used as an apparatus for implementing the ring-back sound ascertainment method of the present invention. Therefore, since a description of the construction and operation of the service apparatus of FIG. 2 is the same as that of the above-described trunk management method, it is omitted.

FIG. 14 is a view showing the basic construction of an apparatus for implementing the ring-back sound ascertainment method in the subscriber-based ring-back sound service according to an embodiment of the present invention. In this case, since the ring-back sound ascertainment method is implemented on the basis of the service apparatus of FIG. 2, the same reference numerals are used throughout FIGS. 2 and 14 to designate the same or similar components.

As shown in FIG. 14, the apparatus includes MSCs 31 and 32 which are nodes of a mobile communication network; the IP server 70; and an Automatic Response Service (ARS) unit 55. The ARS unit 55 has a variety of ring-back sounds to correspond to code information, the same as the IP 50 of FIG. 2. Further, the ARS unit 55 obtains designated information (for example, an originating phone number of a corresponding subscriber which is information of the subscriber that uses a ring-back sound to be heard) while communicating with mobile terminals (not shown) of subscribers connected to the ARS unit 55 through the MSCs 31 and 32 depending on a preset ARS scenario. Further, the ARS unit 55 authenticates the connected subscribers according to the obtained information, and requests and obtains a desired code from the IP server 70 while communicating with the IP server 70 through the Internet 60. Moreover, the ARS unit 55 requests the IP server 70 to change the codes of the connected subscribers depending on the selection of the connected subscribers based on the scenario.

Figure 15:
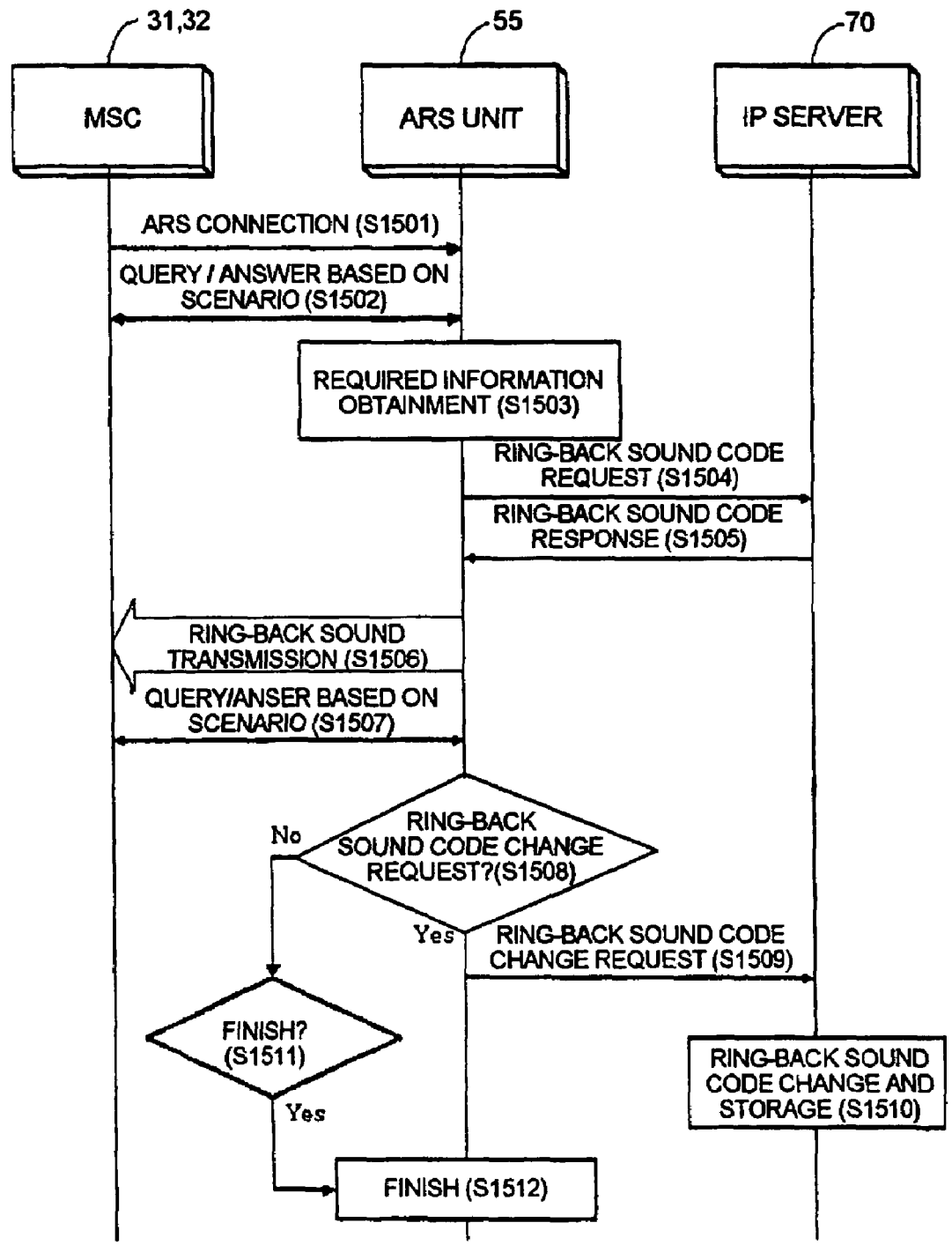
FIG. 15 is a flowchart of the method of ascertaining a ring-back sound in the subscriber-based ring-back sound service according to the embodiment of the present invention.

FIG. 15 is a flowchart of the method of ascertaining a ring-back sound in the subscriber-based ring-back sound service according to the embodiment of the present invention. Since the ring-back sound ascertainment method is applied to the apparatus of FIG. 14, it is described in parallel to the operation of the apparatus.

If a first subscriber's mobile terminal (not shown) is connected to the ARS unit 55 through an originating MSC 31 or 32 (hereinafter, it is premised that the originating MSC is the O_MSC 31) at step S1501, the ARS unit 55 makes queries on the basis of a preset scenario, and the first subscriber answers the queries through the input of a key on the mobile terminal or another means at step S1502. Through such a query/answer procedure, the ARS unit 55 obtains phone number information of an arbitrary second subscriber (the second subscriber may be the same as the first subscriber), selectively input from the first subscriber's mobile terminal, as preset required information, and, simultaneously, obtains an originating phone number from the first subscriber's mobile terminal, that is, the phone number of the first subscriber's mobile terminal, at step S 1503.

For example, the ARS unit 55 obtains the originating phone number provided from the O_MSC 31, that is, the phone number of the first subscriber's mobile terminal, simultaneously with the connection to the first subscriber's mobile terminal at step S1501. Additionally, the ARS unit 55 sends a voice message, such as "please enter a subscriber's phone number using a ring-back sound that you want to ascertain", to the first subscriber's mobile terminal at step S1502. If the first subscriber hears the voice message received through his or her mobile terminal and enters the phone number of the second subscriber's mobile terminal using keys according to the voice message, the ARS unit 55 receives and obtains the phone number information entered using keys at step S1503.

Then, the ARS unit 55 requests a corresponding ring-back sound code from the IP server 70 by querying the code information corresponding to the phone number information of the second subscriber, on the basis of the phone number information of the second subscriber among the phone number information of the first and second subscribers obtained at step S1503.

The IP server 70 responds to the request of step S 1504 by searching the database thereof constructed as shown in FIG. 16 for code information stored to correspond to the phone number of the second subscriber in response to the request, and providing the searched code information to the ARS unit 55 at step S1505. For example, if the second subscriber's phone number is "293-xxxx", the IP server 70 provides code information "07" stored to correspond to the phone number to the ARS unit 50.

The ARS unit 55 searches the database thereof constructed as shown in FIG. 17 for a ring-back sound #7 as a ring-back sound stored to correspond to the code information "07" on the basis of the code information "07" provided from the IP server 70 at step S1505, and transmits the searched ring-back sound #7 to the first subscriber's mobile terminal through the MSC 31 to enable the first subscriber to hear the ring-back sound #7 at step S1506. Therefore, the first subscriber can ascertain the ring-back sound of the second subscriber.

While the ring-back sound #7 is transmitted as in the case of step S1506 or after the transmission has been completed through the repetition thereof for a preset period of time or by a preset number, the ARS unit 55 determines whether a request for the change of the ring-back sound is received from the first subscriber's mobile terminal at step S1508, through a query/answer procedure with the first subscriber's mobile terminal based on the scenario at step S1507.

For example, if a specific key for changing a ring-back sound is selected by the first subscriber's mobile terminal at step S1507 while the ring-back sound #7 is transmitted at step S1506, the ARS unit 55 determines that the ring-back sound change request is received at step S1508. Alternatively, if the ARS unit 55 sends a voice message, such as "press number "1" if you want to change a ring-back sound, and press number "2" if you finish this service", to the first subscriber's mobile terminal after the transmission of the ring-back sound #7 has been completed through the repetition thereof for a preset period of time or by a preset number, and then a key of the number "1" is selected by the first subscriber's mobile terminal in response to the voice message, the ARS unit 55 also determines that the ring-back sound change request is received at step S1508.

If determining that the ring-back sound change request is received at step S1508, the ARS unit 55 requests the IP server 70 to change a ring-back sound code on the basis of the first subscriber's phone number (for example, 294-0000) and the second subscriber's phone number (for example, 293-xxxx), obtained at step S1503, at step S1509.

The IP server 70 changes code information "17", stored in the database thereof to correspond to the first subscriber's phone number "294-0000", to code information "07", stored to correspond to the second subscriber's phone number "293-xxxx" according to the request at step S1509 and stores the changed code information in the database as shown in FIG. 16. That is, the code information stored to correspond to the subscriber's phone number "294-0000" is changed from "17" to "07" at step S1510.

As a result of step S1510, a ring-back sound, a substitute for a typical ring-back tone, transmitted when an originator places a call to the first subscriber, is changed from the ring-back sound #17 corresponding to the previous code "17" to the ring-back sound #7 corresponding to the new code "07", as shown in FIG. 17. That is, the first subscriber sets the ring-back sound heard at step S1506 to his or her new ring-back sound.

Meanwhile, if determining that the ring-back sound change request is not received at step S1508, the ARS unit 55 determines whether "finish" is selected at step S1511. If it is determined that "finish" is selected, the ARS unit 55 finishes the entire process at step S1512.

Further, when the ARS unit 55 is trunk-connected to the MSC 31 at step S1501, the ARS unit 55 authenticates the first subscriber on the basis of the phone number of the first subscriber's mobile terminal, which is the originating phone number provided from the MSC 31. Further, the ARS unit 55 can determine whether to perform a procedure after step S1501 according to the authenticated results.

INDUSTRIAL APPLICABILITY

As described above, the present invention provides a trunk management method to provide a ring-back sound in a subscriber-based ring-back sound service, which prevents muting which may occur due to a difference between a time period for transmitting a typical ring-back tone and preset in a mobile switching center, and a time period for playing a ring-back sound stored in an intelligent peripheral, a No Page Response (NPR) state, No Answer (NA) state or the like.

According to a ring-back sound query method sound in a subscriber-based ring-back sound service of the present invention, there are advantages in that respective intelligent peripherals are locally dispersed and installed close to mobile switching centers without passing through a gateway, thus saving trunk resources between mobile switching centers and intelligent peripherals, preventing mobile switching centers from excessively occupying trunk resources, and promptly transmitting a ring-back sound instead of a typical ring-back tone.

Further, according to the ring-back sound ascertainment method in a subscriber-based ring-back sound service of the present invention, there are advantages in that a subscriber can ascertain his or her own ring-back sound or another subscriber's ring back sound without unnecessarily occupying trunk resources or without placing a call, and set the ascertained ring-back sound to his or her new ring-back sound.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of managing a trunk to provide a ring-back sound in a subscriber-based ring-back sound service, the ring-back sound service method including the steps of a) a home location register providing first information indicating whether a ring-back tone preset in the home location register is substituted and second information for performing routing to intelligent peripheral means to a corresponding terminating mobile switching center when a location of a terminating subscriber is registered; b) the terminating mobile switching center providing a ring-back tone to an arbitrary originator or requesting a connection of a trunk call from the intelligent peripheral means according to the first and second information, when the terminating mobile switching center recognizes a call connection request transmitted from the arbitrary originator to the terminating subscriber, c) the intelligent peripheral means searching for a ring-back sound preset with respect to the terminating subscriber after connecting the trunk call in response to the trunk call connection request, and providing the searched ring-back sound to the originator instead of the ring-back tone through the trunk-connected terminating mobile switching center, the trunk management method comprises the steps of:

The terminating mobile switching center requesting a release of the connected trunk call from the intelligent peripheral means when an answer of the terminating subscriber is recognized or when a first predetermined period of time has elapsed from a time when it is recognized that the searched ring-back sound is provided to the originator; and The intelligent peripheral means requesting a release of the connected trunk call from the terminating mobile switching center when a second predetermined period of time has elapsed from a time when the ring-back sound begins to be provided.

2. The trunk management method according to claim 1, wherein the first and second predetermined period of times are set in consideration of a ring-back tone transmission time preset in the terminating mobile switching center, and a length of the ring-back sound.

3. The trunk management method according to claim 2, wherein the length of the ring-back sound is an average length of all ring-back sounds.

4. The trunk management method according to claim 1, wherein the second predetermined period of time is set to be equal to or longer than the first predetermined period of time.

5. A method of querying a ring-back sound in a subscriber-based ring-back sound service, in which routing from at least one intelligent peripheral to at least one intelligent peripheral server is performed to query a ring-back sound in a subscriber-based ring-back sound service process, the intelligent peripheral being constructed in such a way that a plurality of intelligent peripherals are installed according to mobile switching centers or mobile switching center groups to allow one or more adjacent mobile switching centers to be directly trunk-connected to one of the intelligent peripherals according to singular routing information, and the intelligent peripheral server being constructed in such a way that ring-back sound codes corresponding to ring-back sounds stored in the intelligent peripherals are stored in the intelligent peripheral server to be preset and registered according to subscribers, and a plurality of intelligent peripheral servers are installed according to phone numbers of subscriber terminals, prefix numbers thereof, prefix number groups thereof, or main working areas of the subscribers to correspond to information of the subscribers, the method comprising the steps of a) when a request for a trunk call connection that allows a ring-back sound preset and registered with respect to a terminating terminal to be transmitted to an originating terminal instead of a typical ring-back tone according to routing information to a corresponding intelligent peripheral provided from the home location register, is received from a corresponding mobile switching center, the corresponding intelligent peripheral searching for routing information to one among the plurality of intelligent peripheral servers depending on information of the terminating subscriber provided from the trunk-connected corresponding mobile switching center; and b) the corresponding intelligent peripheral performing routing to the corresponding intelligent peripheral server depending on the searched routing information and querying and obtaining a code of a corresponding ring-back sound depending on the information of the terminating subscriber.

6. The ring-back sound query method according to claim 5, wherein each of the intelligent peripherals has ring-back sounds of all subscribers to correspond to the codes.

7. The ring-back sound query method according to claim 5, wherein each of the intelligent peripherals and each of the intelligent peripheral servers communicate with each other through Internet protocol.

8. The ring-back sound query method according to claim 5, wherein the information of the terminating subscriber is a phone number thereof.

9. A method of ascertaining a ring-back sound in a subscriber-based ring-back sound service, which allows a subscriber to ascertain his or her own ring-back sound or another subscriber's ring-back sound substituting for a typical ring-back tone using an automatic response service unit having a variety of ring-back sounds as specific sounds to correspond to code information when the subscribed-based ring-back sound service for providing a terminating subscriber's desired specific sound instead of the ring back tone is implemented, the automatic response service unit performing the steps of:

a) obtaining information of an arbitrary second subscriber using a ring-back sound to be ascertained while communicating with a mobile terminal of a first subscriber connected to the automatic response service unit through a mobile communication network depending on a preset scenario;

b) requesting and obtaining code information corresponding to the second subscriber information from an intelligent peripheral server while communicating with the intelligent peripheral server having the code information to correspond to the subscriber information; and c) transmitting a ring-back sound provided to correspond to the obtained code information to the mobile terminal of the first subscriber.

10. The ring-back sound ascertainment method according to claim 9, further comprising the step of d) changing code information corresponding to the first subscriber information to code information corresponding to the second subscriber information while communicating with the intelligent peripheral server, when a request for change of the transmitted ring-back sound is received from the mobile terminal of the first subscriber depending on the scenario.

11. The ring-back sound ascertainment method according to claim 9 or 10, wherein the subscriber information is a phone number of a mobile terminal of each subscriber.

12. The ring-back sound ascertainment method according to claim 9 or 10, further comprising the step of authenticating the first subscriber depending on an originating number from the mobile terminal of the first subscriber.

13. The ring-back sound ascertainment method according to claim 9, wherein the automatic response service unit and the intelligent peripheral server communicate with each other through the Internet.

* * * * *